(12) United States Patent
Langworthy et al.

(10) Patent No.: US 10,472,092 B2
(45) Date of Patent: Nov. 12, 2019

(54) CAM MECHANISM FOR MOVING A SENSOR WITHIN A VOLUME CONSTRAINED COMPARTMENT

(71) Applicant: Goodrich Corporation, Charlotte, NC (US)

(72) Inventors: Joanna Langworthy, Merrimack, NH (US); Luke N. Asselin, Amesbury, MA (US); Mario R. Pieri, Chelmsford, MA (US); Eric A. Sindel, Charlotte, NC (US)

(73) Assignee: Goodrich Corporation, Charlotte, NC (US)

( * ) Notice: Subject to any disclaimer, the term of this patent is extended or adjusted under 35 U.S.C. 154(b) by 10 days.

(21) Appl. No.: 15/923,085

(22) Filed: Mar. 16, 2018

(65) Prior Publication Data

US 2019/0283899 A1    Sep. 19, 2019

(51) Int. Cl.
*B64D 47/08* (2006.01)
*F16M 13/02* (2006.01)
*F16H 53/08* (2006.01)
*H04N 5/225* (2006.01)
*F16H 25/20* (2006.01)

(52) U.S. Cl.
CPC ............. *B64D 47/08* (2013.01); *F16H 25/20* (2013.01); *F16H 53/08* (2013.01); *F16M 13/022* (2013.01); *H04N 5/2252* (2013.01); *H04N 5/2253* (2013.01); *F16H 2025/2062* (2013.01)

(58) Field of Classification Search
CPC ......... B64D 47/08; F16H 25/20; F16H 53/08; F16H 2025/2062; H04N 5/2252; H04N 5/2253
See application file for complete search history.

(56) References Cited

U.S. PATENT DOCUMENTS 3,486,608 A    12/1969   Rogers
3,768,526 A *  10/1973   Sanz ................... G01N 35/026
                                                           141/130

(Continued)

FOREIGN PATENT DOCUMENTS

ES            2222849 A1    2/2005

OTHER PUBLICATIONS

Extended European Search Report dated Aug. 2, 2019, issued during the prosecution of European Patent Application No. EP 19160397.6.

*Primary Examiner* — Anita M King
(74) *Attorney, Agent, or Firm* — Locke Lord LLP; Scott D. Wofsy (57) ABSTRACT

A mechanism for moving a sensor within a volume constrained sensor compartment, which includes a cam path defined within the compartment, a cam follower mounted for movement throughout the cam path, a support assembly connected to the cam follower for carrying the sensor within the compartment as the cam follower moves throughout the cam path, and a flipper cam mounted for movement relative to the cam path between a first position permitting the cam follower to move within a left side portion of the cam path so as to translate and rotate the sensor within a left side of the compartment and a second position permitting the cam follower to move within a right side portion of the cam path so as to translate and rotate the sensor within a right side of the compartment.

15 Claims, 9 Drawing Sheets

(56) References Cited

U.S. PATENT DOCUMENTS

| | | | |
|---|---|---|---|
| 6,421,031 B1* | 7/2002 | Ronzani | G02B 27/017 345/8 |
| 6,763,850 B1 | 7/2004 | Jansen et al. | |
| 8,069,611 B2 | 12/2011 | Kitayama | |
| 9,854,179 B2 | 12/2017 | Nishio | |
| 2017/0152947 A1* | 6/2017 | Imafuku | B60K 17/02 |
| 2017/0327243 A1* | 11/2017 | Chaduc | B64D 47/08 |

* cited by examiner

CAM MECHANISM FOR MOVING A SENSOR WITHIN A VOLUME CONSTRAINED COMPARTMENT

BACKGROUND OF THE INVENTION

1. Field of the Invention

The subject invention is directed to a mechanism for moving a component within a volume constrained compartment, and more particularly, to a cam mechanism for translating and rotating a sensor within a volume constrained sensor compartment to collect imagery from an airborne reconnaissance platform.

2. Description of Related Art

It is known to mount a sensor within a reconnaissance pod mounted to the underside of an aircraft to collect imagery on the ground. The reconnaissance pod has a window to permit the sensor to observe a scene over a specified field of view. The sensor is typically mounted for movement within the reconnaissance pod in an azimuthal direction from side-to-side and axially rotated within to view a scene on either side of the aircraft ground path and to permit the sensor to remain aimed at the scene when the aircraft banks or rolls.

The side to side and rotational movement of the sensor within the interior compartment of the reconnaissance pod is often achieved by a motorized drive system having a fixed cam design. However, in some reconnaissance pods, the interior compartment of the pod may be relatively small, so that volume constraints do not allow for a fixed cam design to accomplish the requisite sensor movements.

For this reason, it would be beneficial to provide a cam mechanism that is uniquely designed to move a sensor in an azimuthal direction and rotationally, within a volume constrained reconnaissance pod to collect imagery on the ground.

SUMMARY OF THE DISCLOSURE

The subject invention is directed to a new and useful mechanism for moving a component within a volume constrained compartment, and more particularly, to a dynamic cam mechanism for simultaneously translating and rotating a sensor within a volume constrained sensor compartment of a reconnaissance pod mounted to the underside of an aircraft to collect imagery.

The cam mechanism includes a cam path defined in an interior surface of an end plate of the compartment. The cam path includes opposed left and right arcuate side portions and a central vertical portion that conjoins the left and right arcuate side portions of the cam path. A cam follower is mounted for movement throughout the cam path, and a support assembly is connected to the cam follower for carrying the component within the compartment as the cam follower moves throughout the cam path.

The cam mechanism further includes a flipper cam that is mounted for movement relative to the cam path between a first position permitting the cam follower to move within the left arcuate side portion and central vertical portion of the cam path so as to translate and rotate the component within a left side of the compartment, and a second position permitting the cam follower to move within the right arcuate side portion and central vertical portion of the cam path so as to translate and rotate the component within a right side of the compartment. The cam path further includes a left horizontal side portion adjoined with the left arcuate side portion of the cam path and a right horizontal side portion adjoined with the right arcuate side portion of the cam path.

The cam mechanism further includes a motor mounted to an exterior surface of the end plate for moving the cam follower throughout the cam path, wherein the motor is operatively connected to a lead screw that is rotatably supported on the interior surface of the end plate. The support assembly includes a connecting block that is threadably associated with the lead screw and mounted to translate relative thereto in a linear direction. The connecting block has an upstanding actuation pin for moving the flipper cam between the first and second positions as the connecting block translates along the lead screw.

The support assembly further includes a translation plate that is mounted to the connecting block for linear translation therewith. A rotation plate is connected to the cam follower by a rotation arm that extends through a rotation aperture in the translation plate, wherein the rotation plate is adapted to translate with and rotate relative to the translation plate. A support bracket is connected to the rotation plate and it moves therewith for supporting the component. Parallel linear slides are mounted on the interior surface of the end plate, above and below the cam path, and the translation plate is supported for linear translation along the linear slides. End stops are provided at each end of each linear slide for limiting the linear translation of the translation plate.

The flipper cam is pivotally connected to the end plate of the compartment and an over-centered spring mechanism is associated with an exterior surface of the end plate to retain the flipper cam in the first and second positions thereof until the flipper cam is moved by the actuation pin of the connecting block. The flipper cam includes a cam arm with a left arcuate cam surface that forms part of the left arcuate side portion of the cam path and a right arcuate cam surface that forms part of the right arcuate side portion of the cam path. The flipper cam further includes right and left legs for interacting with the actuation pin on the connecting block.

These and other features of the cam mechanism of the subject invention will become more readily apparent to those having ordinary skill in the art to which the subject invention appertains from the detailed description of the preferred embodiments taken in conjunction with the following brief description of the drawings.

BRIEF DESCRIPTION OF THE DRAWINGS

So that those skilled in the art will readily understand how to make and use the cam mechanism of the subject invention without undue experimentation, preferred embodiments thereof will be described in detail herein below with reference to the figures wherein:

FIGS. 6 through 8 are plan views of the forward end plate shown in FIG. 3, illustrating the linear and rotational translation of the support assembly connected to the cam follower, as the cam follower moves throughout the cam path, wherein:

FIGS. 9 through 12 are enlarged localized perspective views of the forward end plate shown in FIG. 3, illustrating pivotal movement of the flipper cam between a first position and a second position in response to the linear translation of the connecting block along the lead screw, wherein:

DETAILED DESCRIPTION OF THE PREFERRED EMBODIMENTS

Figure 1:
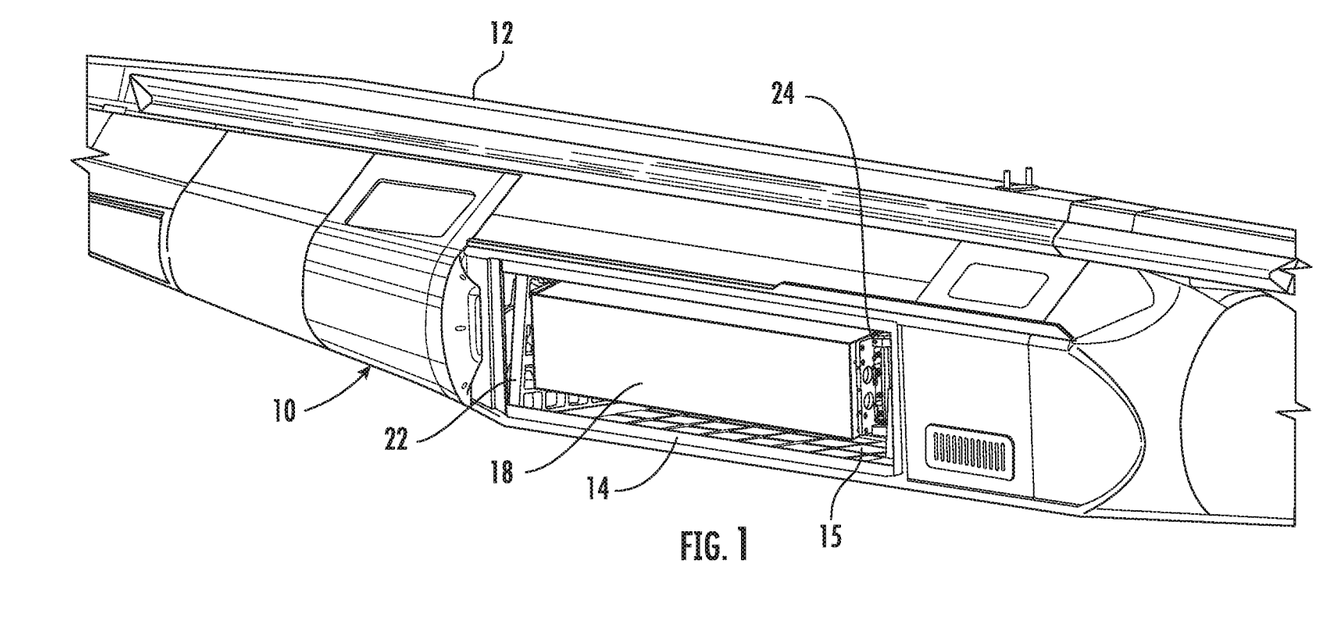
FIG. 1 is perspective view of a reconnaissance pod mounted to the underside of an aircraft, which defines a volume constrained sensor compartment housing a sensor assembly and the cam mechanism of the subject invention.

Referring now to the drawings wherein like reference numerals identify similar structural elements and features of the subject invention, there is illustrated in FIG. 1 a reconnaissance pod 10 mounted to the underside of an airborne platform or aircraft 12 within which the unique cam mechanism of the subject invention is housed.

Figure 2:
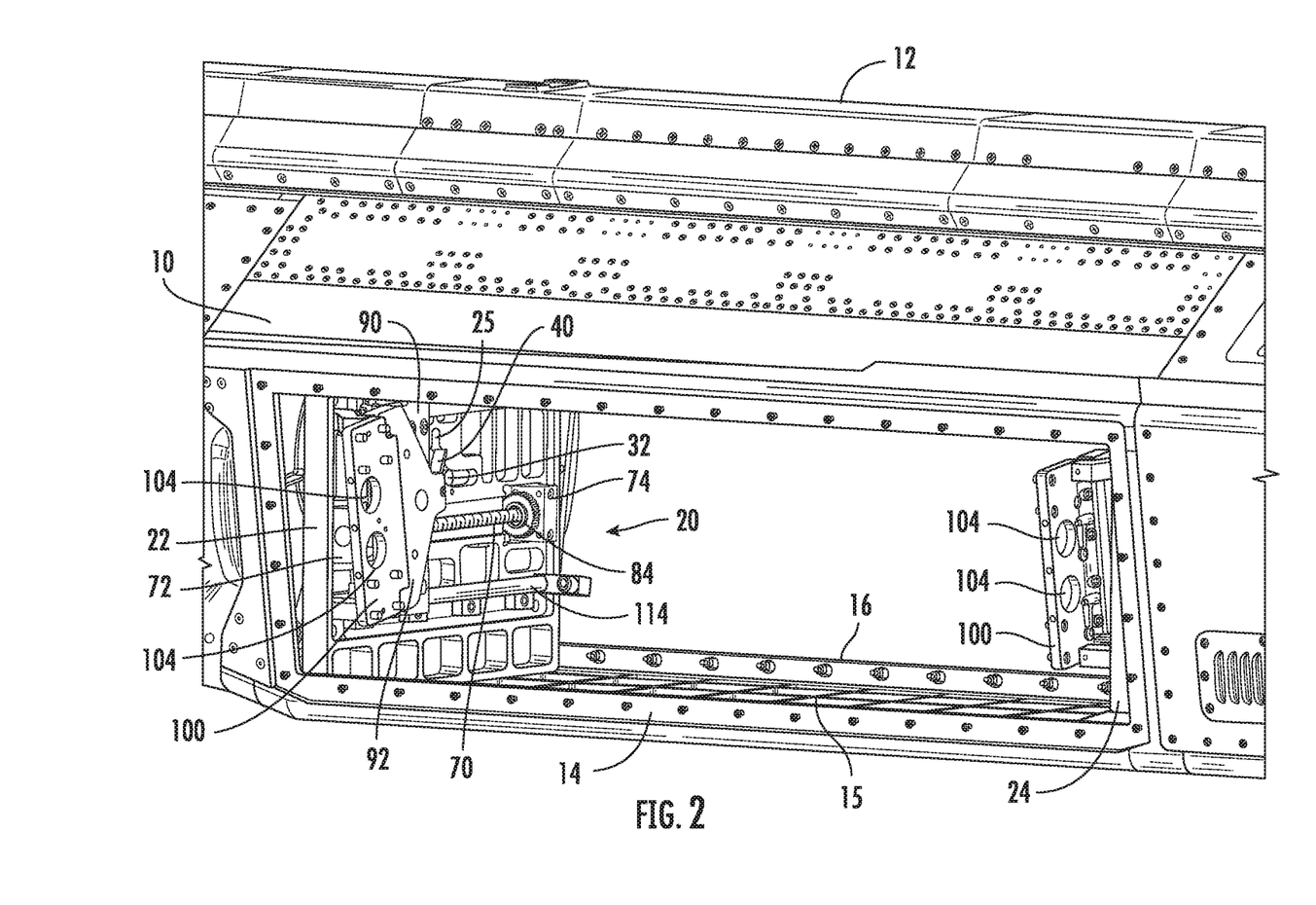
FIG. 2 is an enlarged perspective view of the sensor compartment shown in FIG. 1, with the sensor assembly removed from the compartment to better illustrate the cam mechanism of the subject invention, which includes forward and rearward end plates at the fore and aft ends of the compartment.

More particularly, as best seen in FIG. 2, the reconnaissance pod 10 defines a relatively small, volume constrained interior compartment 15, having left and right side viewports 14 and 16 for housing a sensor assembly 18 (shown in FIG. 1) that is used to collect airborne imagery from both sides of the aircraft 12. Because of these size constraints, a uniquely designed cam mechanism is required to facilitate the movement of the sensor assembly 18 in an azimuthal direction (from side-to-side) and rotationally within the interior compartment 15, in order to collect imagery through both the left and right windows 14 and 16 of the interior compartment 15 of reconnaissance pod 10.

As best seen in FIG. 2, the subject invention provides a new and useful dynamic cam mechanism that is designated generally by reference numeral 20, for moving the sensor assembly 18 within the interior compartment 15 of the reconnaissance pod 10. More particularly, the cam mechanism 20 is adapted and configured to translate the sensor assembly 18 in a side-to-side azimuthal direction, while simultaneously rotating the sensor assembly 18 within the interior compartment 15 to collect imagery from both the right and left sides of the compartment 15.

The cam mechanism 20 includes a front end plate 22 that is located adjacent the fore end of compartment 15 and a rear end plate 24 that is located adjacent the aft end of compartment 15. The two end plates 22 and 24 are preferably made from a light weight metal, such as aircraft grade aluminum, and they are weight relieved so to reduce the overall mass of the system.

For illustrative purposes, the description that follows will focus upon the structure and function of the front end plate 22 and the components associated therewith. However, those skilled in the art should readily appreciate that two end plates 22 and 24 essentially mirror one another from a structural and functional standpoint. Moreover, it should be understood that both end plates 22 and 24 include a similar cam mechanism 20, and these mechanisms will work in tandem to move the sensor assembly 18 within compartment 15, through an appropriate electronic control system.

Figure 3:
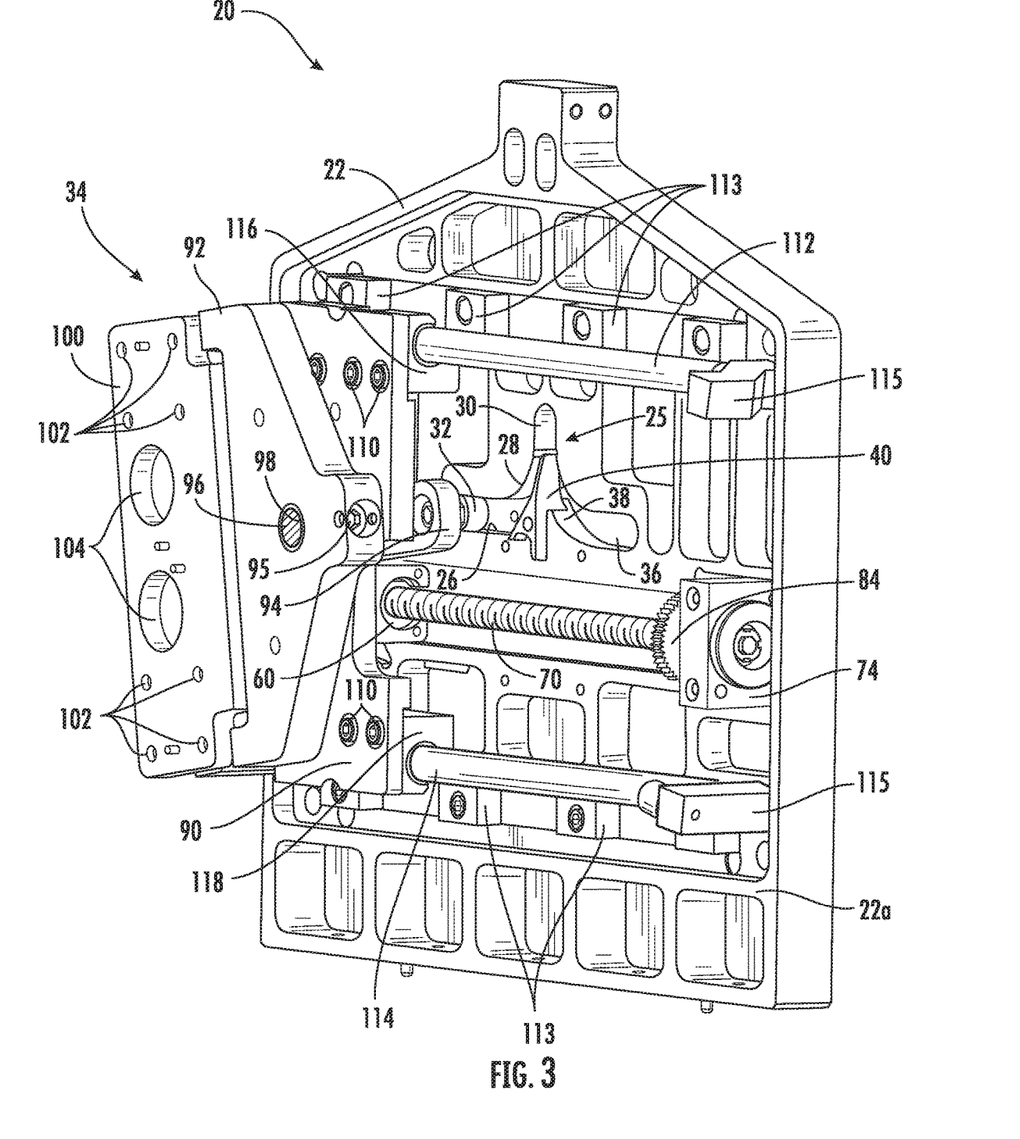
FIG. 3 is a perspective view of the interior surface of the forward end plate of the cam mechanism shown in FIG. 2, removed from the sensor compartment, which includes a cam follower mounted for movement throughout a continuous cam path defined in the interior surface of the end plate, a support assembly associated with the cam follower for carrying the sensor assembly, and a flipper cam mounted for movement relative to the cam path to control the movement of the cam follower within the cam path.

Referring now to FIG. 3, the cam mechanism 20 includes a continuous cam path 25 that is defined or otherwise formed within the interior surface 22a of the front end plate 22. The cam path 25 includes a left horizontal side portion 26, an adjoining left arcuate side portion 28, a right horizontal side portion 36, an adjoining right arcuate side portion 38, and a central vertical portion 30 that conjoins the left and right arcuate side portions 28 and 38 of the cam path 25.

A circular cam follower 32 is mounted for guided movement throughout the cam path 25, and a multi-plate support assembly 34 is connected to the cam follower 32. The multi-plate support assembly 34 is adapted and configured to support or otherwise carry the sensor assembly 18 within the compartment 15 as the cam follower 32 moves throughout the cam path 25. The components of the multi-plate support assembly 34 will be described in greater detail below.

Figure 6:
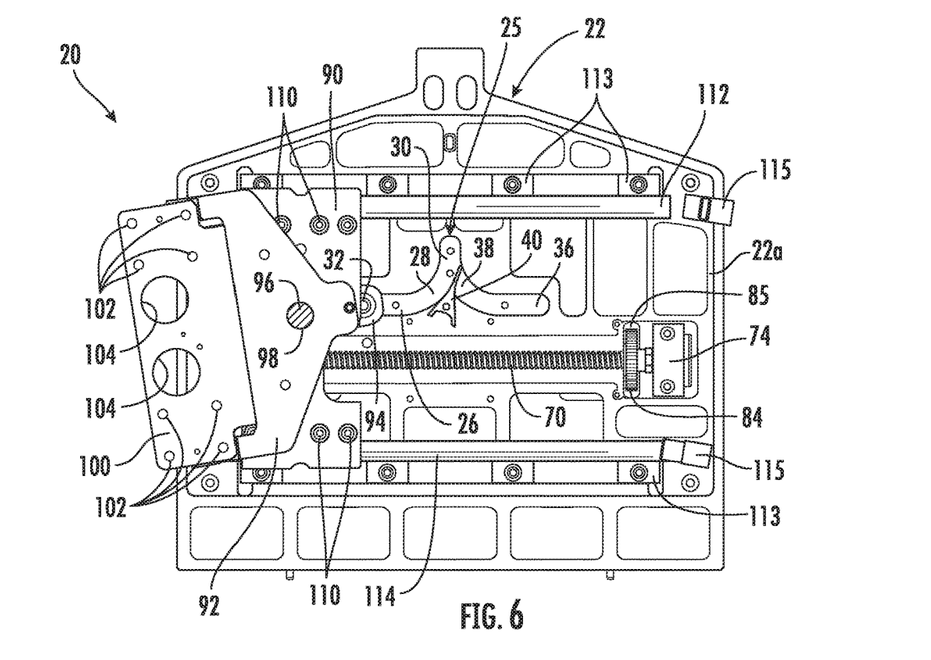
FIG. 6 shows the support assembly in the left side of the compartment.
Figure 7:
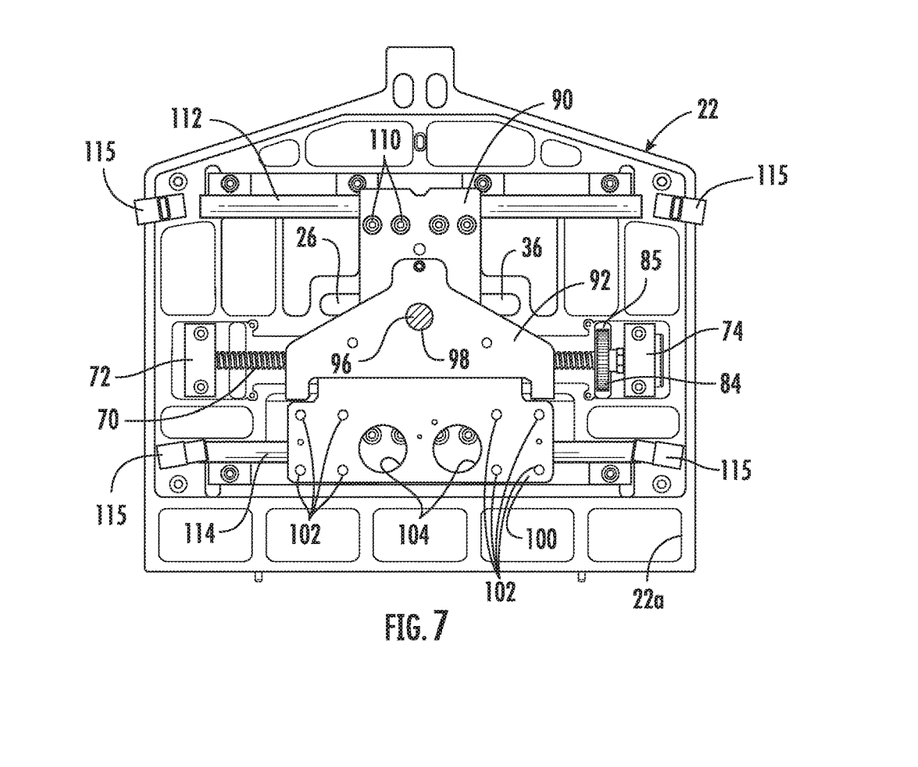
FIG. 7 shows the support assembly in the center of the compartment.
Figure 8:
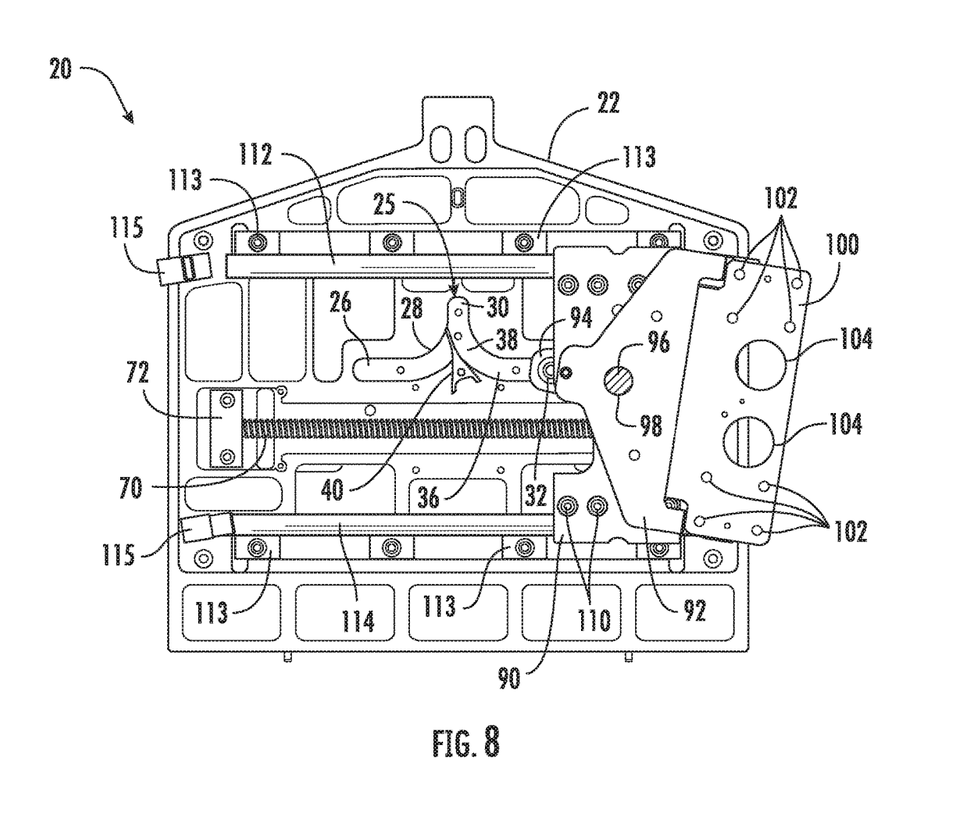
FIG. 8 shows the support assembly in the right side of the compartment.
Figure 9:
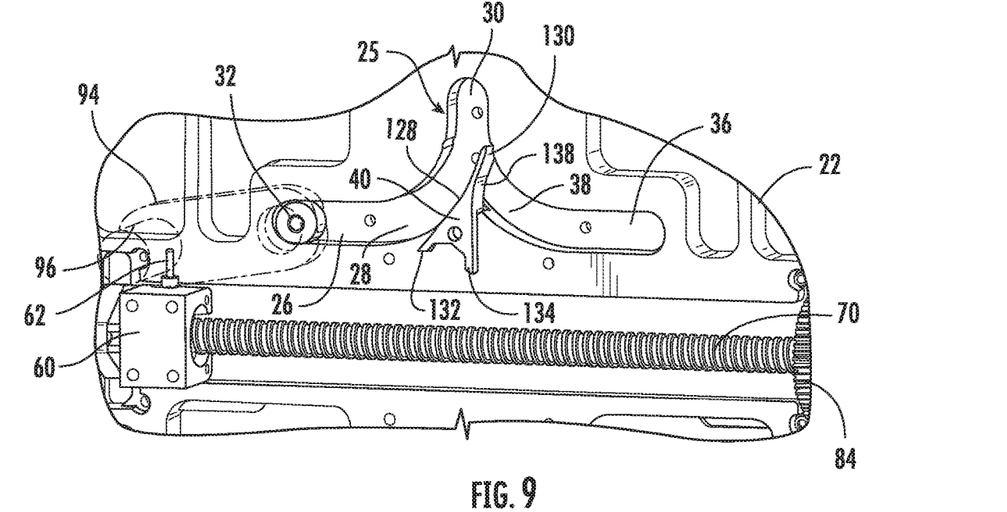
FIG. 9 shows the cam follower in the left-most position within the left horizontal side portion of the cam path, with the flipper cam in its first position to permit the cam follower and support assembly to translate and rotate within the left side of the compartment.
Figure 10:
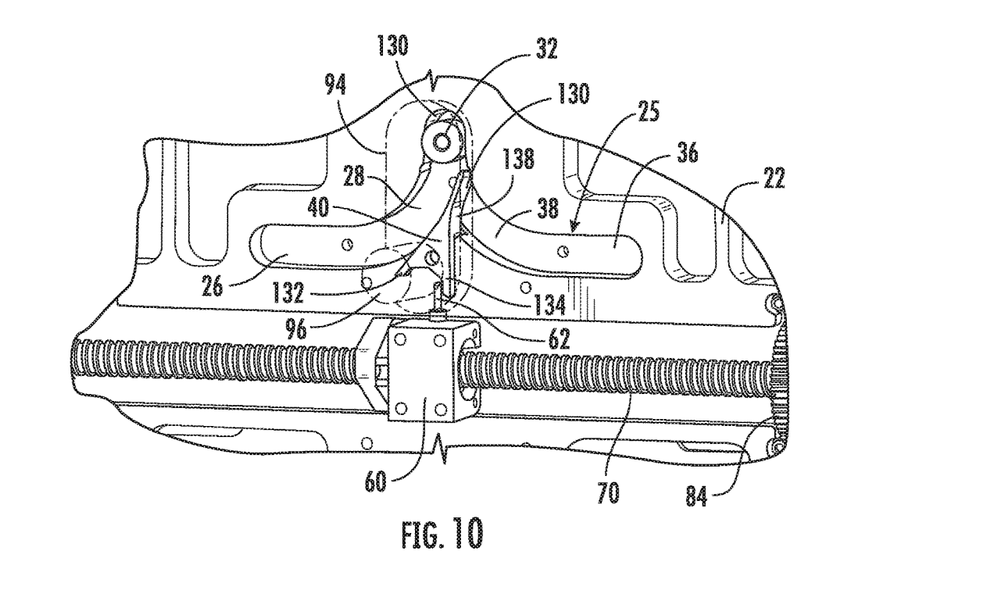
FIG. 10 shows the cam follower in the apex of the central vertical portion of the cam path, with the flipper cam still in the first position, just before the actuation pin on the connecting block contacts the right side leg of the flipper cam to move it to the second position relative to the cam path.
Figure 11:
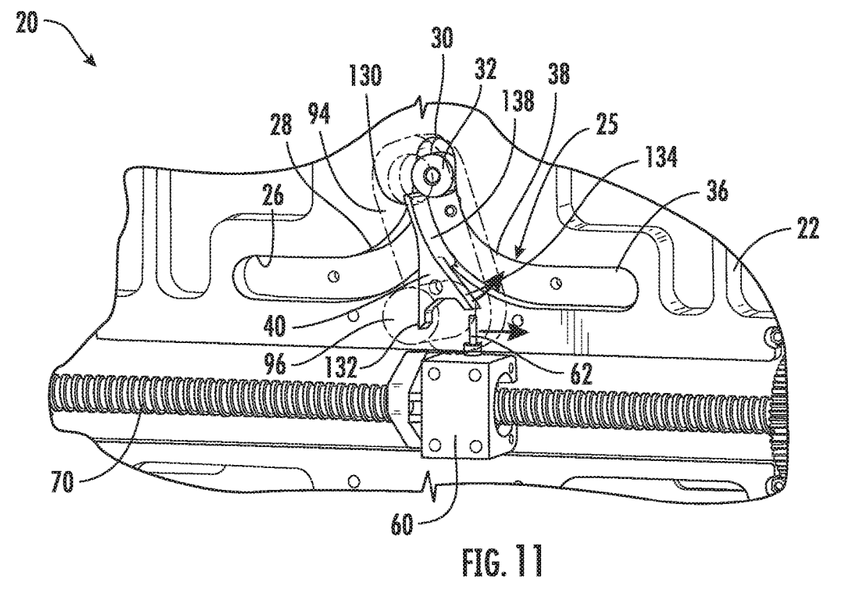
FIG. 11 shows the cam follower in the apex of the central vertical portion of the cam path, with the flipper cam moved to its second position to permit the cam follower and support assembly to translate and rotate within the right side of the compartment.
Figure 12:
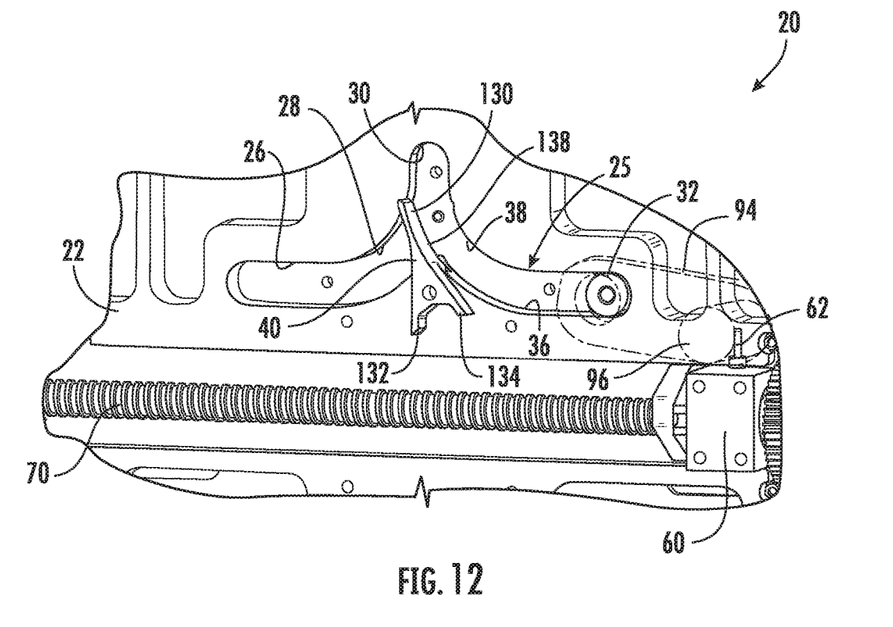
FIG. 12 shows the cam follower in the right-most position within the right horizontal side portion of the cam path, with the flipper cam in its second position.

The cam mechanism 20 further includes a flipper cam 40 that is mounted for pivotal movement about a pivot pin 42 relative to the cam path 25 between a first position shown in FIGS. 6, 9 and 10 and a second position shown in FIGS. 8, 11 and 12. When the flipper cam 40 is located in the first position of FIGS. 6, 9 and 10, the cam follower 32 is permitted to move within the left horizontal side portion 26, the left arcuate side portion 28 and the central vertical portion 30 of the cam path 25. Thus, the support assembly 34 is permitted to translate linearly and rotationally within the left side of the compartment 15, as shown in FIGS. 6 and 7. This enables the sensor assembly 18 to obtain imagery from the left side viewport 14 of compartment 15.

In contrast, when the flipper cam 40 is located in the second position of FIGS. 8, 11 and 12, the cam follower 32 is permitted to move within the right horizontal side portion 36, the right arcuate side portion 38 and the central vertical portion 30 of the cam path 25. Thus, the support assembly 34 is permitted to translate linearly and rotationally within the right side of the compartment 15, as shown in FIGS. 7 and 8. This enables the sensor assembly 18 to obtain imagery from the right side viewport 16 of compartment 15.

Figure 4:
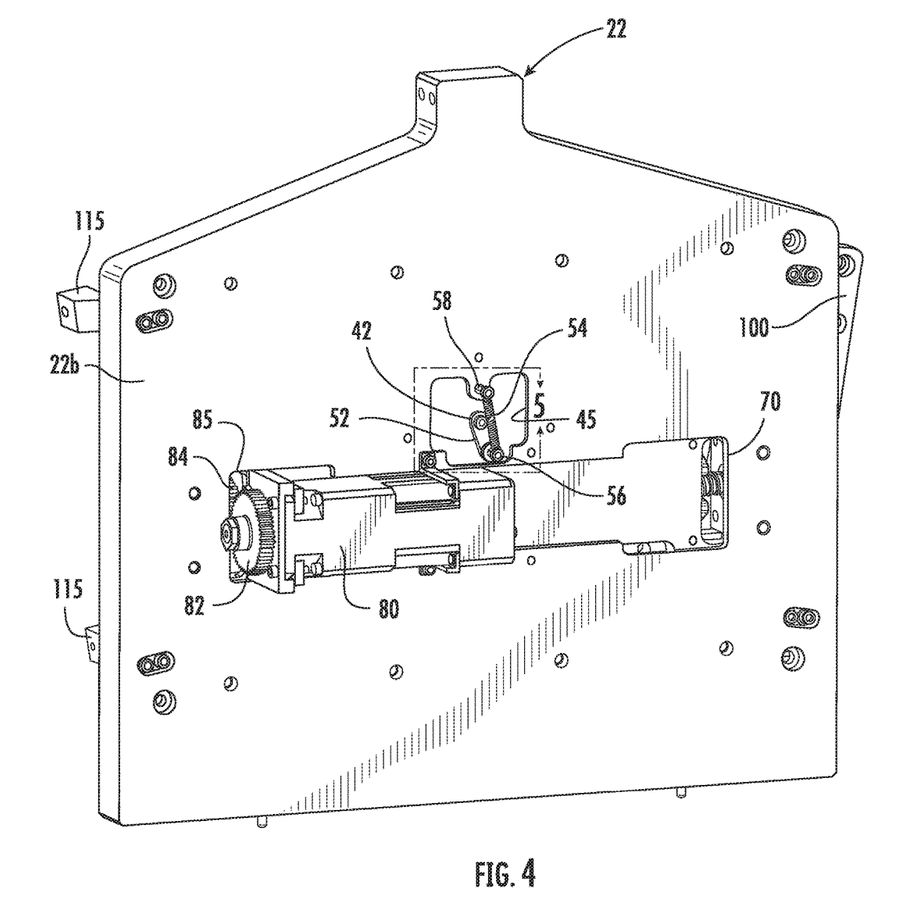
FIG. 4 is a perspective view of the exterior surface of the forward end plate of the cam mechanism shown in FIG. 2, illustrating the motor for moving the cam follower through the cam path and the over-centered spring mechanism associated with the flipper cam, which is adapted and configured to maintain the flipper cam in each of its two operative positions.
Figure 5:
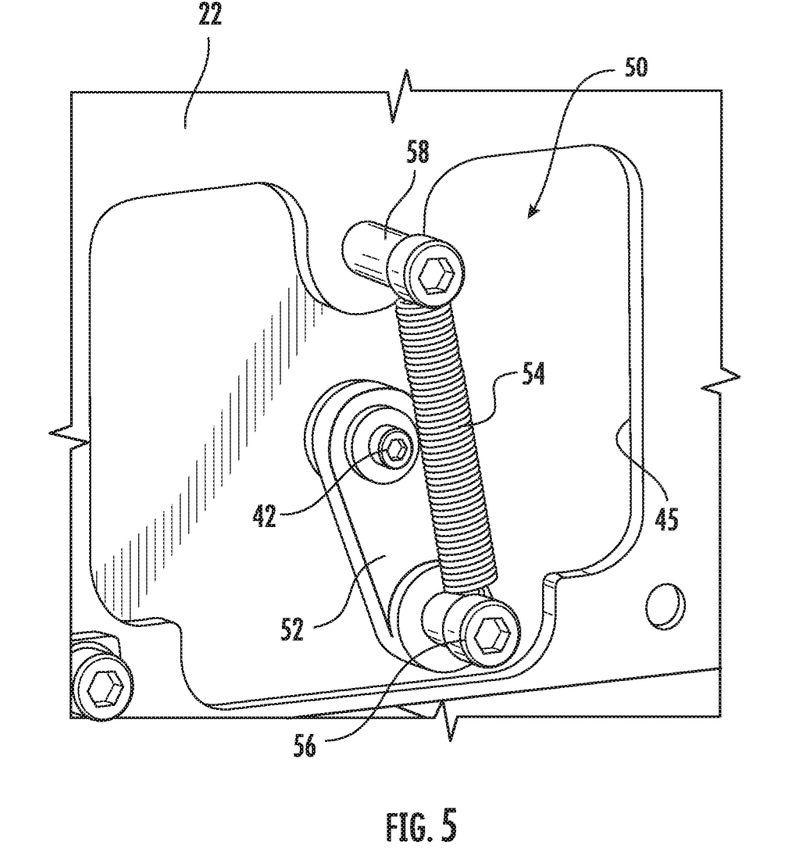
FIG. 5 is an enlarged localized perspective view of exterior side of the forward end plate illustrating the over-centered spring mechanism shown in FIG. 4.

Referring to FIGS. 4 and 5, an over-centered spring mechanism 50 is accommodated within a cavity 45 formed in the exterior surface 22b of end plate 22, for retaining the flipper cam 40 in either the first or the second positions. The over-centered spring mechanism 50 includes a rocker link 52 and a coiled spring 54. The rocker link 52 is mounted at its upper end and rotates about the flipper cam pivot pin 42. The lower free end of rocker link 52 is connected by a fastener 56 to a free end of a coiled biasing spring 54. The opposite end of the coiled biasing spring 54 is fixedly connected to the exterior surface of end plate 22 by a fastener 58. The over-centered spring mechanism 50 functions to positively maintain the flipper cam 40 in either the first position or the second position, unless and until it is physically moved out of either of those positions by another component, which will be described in more detail below.

With continuing reference to FIG. 3 in conjunction with FIGS. 9 through 12, the flipper cam 40 includes an upper cam arm 130 with a left arcuate cam surface 128 that dynamically forms part of the left arcuate side portion 28 of the cam path 25 in one operative position thereof, which is shown in FIGS. 9 and 10. The flipper cam 40 further includes a right arcuate cam surface 138 that dynamically forms part of the right arcuate side portion 38 of the cam path 25 in another operative position thereof, which is shown in FIGS. 11 and 12.

The flipper cam 40 further includes left and right side legs 132 and 134 for interacting with an upstanding actuation pin 62 associated with a linearly translating connecting block 60. More particularly, as illustrated in FIGS. 10 and 11, as the connecting block 60 translates from side-to-side (here from left to right) along an elongated lead screw 70 relative to the flipper cam 40, the actuation pin 62 will physically interfere with or otherwise contact one of the legs 132 and 134 of the flipper cam 40. This will cause the flipper cam 40 to overcome the bias of the coiled spring 54 of the over-centered spring mechanism 50, and pivot from one operative position to the other relative to the cam path 25. Once in position, the over-centered spring mechanism 50 will act to retain the flipper cam 40 in that portion until it is once again acted upon by the actuation pin 62 of connecting block 60.

Referring now to FIG. 4 in conjunction with FIGS. 6 through 8, the cam mechanism 20 further includes a drive motor 80 mounted to an exterior surface 22b of the forward end plate 22 for driving or otherwise rotating the lead screw 70 associated with the interior surface 22a of the forward end plate 22. The axial rotation of lead screw 70 causes the connecting block 60 as the associated multi-plate support assembly 34 to translate from side-to-side. The elongated lead screw 70 is rotatably supported on the interior surface 22a of the end plate 22 between left and right side journal bearings 72 and 74.

Intermeshed spur gears 82 and 84 operatively connect the drive motor 80 to the lead screw 70 through a transmission slot 85 in end plate 22. More particularly, an outer drive gear 82 is in direct communication with the motor 80 and inner driven gear 84 is mounted coaxially with the lead screw 70. When the motor drives the outer gear 82, the inner gear 84 turns lead screw 70 within bearings 72 and 74. This causes the connecting block 60 to move in a linear direction along the lead screw 70.

Referring back to FIG. 3 in conjunction with FIGS. 6 through 8, the multi-plate support assembly 34 includes the connecting block 60, which is threadably associated with the lead screw 70 and is mounted to translate relative thereto in a linear direction upon the axial rotation of the lead screw 70. The support assembly 34 further includes a translation plate 90 that is directly mounted to the connecting block 60 for linear translation therewith. A rotation plate 92 is operatively associated with the translation plate 90 and it is directly connected to the cam follower 32 by way of a rotation arm 94.

More particularly, the rotation arm 94 includes a transverse stem 96 (shown in FIGS. 9-12) which physically passes through the translation plate 90 and is fixedly connected to the rotation plate 92 within a mounting aperture 98. A compression screw 95 secures the stem 96 in the mounting aperture 98 of rotation plate 92. Consequently, when the rotation plate 92 translates with the connecting block 60, the rotation plate 92 will translate with and rotate relative to the translation plate 90, as depicted in FIGS. 6 through 8.

A support bracket 100 is attached to the rotation plate 92 of support assembly 34 and it moves with the rotation plate 92 for carrying the sensor assembly 18 (shown in FIG. 1). More particularly, the support bracket 100 includes a plurality of mounting apertures 102 for cooperating with appropriate fasteners (not shown) that mount the sensor assembly 18 to support bracket 100. In addition, light-weighting holes 104 are provided in plate 100 to reduce the overall mass of the system.

In operation, as shown in FIGS. 6 through 8, when the connecting block 60 translates along the lead screw 70, the translation plate 90 moves in tandem therewith. The movement of connecting block 60 by lead screw 70 also causes the cam follower 32 to move throughout the cam path 25, since the stem 96 of rotation arm 94 extends physically through the translation plate 70. Furthermore, as the cam follower 32 moves along the cam path 25, the interconnected rotation arm 94 moves simultaneously therewith, as do the rotation plate 92 and the support bracket 100. This results in the simultaneous azimuthal and rotational movement of the sensor assembly 18 within the volume constrained compartment 15 of reconnaissance pod 10.

With continuing reference to FIGS. 3 and 6 through 8, parallel linear slide rods 112 and 114 are mounted on the interior surface 22a of the end plate 22, above and below the cam path 25, by a plurality of spaced apart fasteners 113. The translation plate 90 is supported for linear translation along the linear slide rods 112, 114 by upper and lower slide bearings 116 and 118. More particularly, threaded fasteners 110 secure the translation plate 90 to the upper and lower slide bearings 116 and 118. This connection enables the connection block 60 to translate linearly with respect to the lead screw 70, rather than rotate therewith. Resilient end stops 115 are provided at each end of each linear slide rods 112, 114 for limiting the linear translation of the translation plate 90, as shown in FIGS. 6 and 8.

As noted above, those skilled in the art will readily appreciate that certain structural components of the multi-plate support assembly 34 are also associated with the rear end plate 24 of cam mechanism 20, including, without limitation, translation plate 90, rotation plate 92 and support bracket 100, as well as the linear slide rods 112 and 114 that support the translation plate 90. To the extent necessary, the rear end plate 24 could also include additional structural features including the cam path 25, a cam follower 32 and a rotation arm 94.

While the subject disclosure has been shown and described with reference to preferred embodiments, those skilled in the art will readily appreciate that changes and/or modifications may be made thereto without departing from the scope of the subject disclosure.

What is claimed is:

1. A mechanism for translating and rotating a component within a volume constrained compartment, comprising:
   a) a cam path defined in an interior surface of an end plate of the compartment and including opposed left and right arcuate side portions and a central vertical portion that conjoins the left and right arcuate side portions;
   b) a cam follower mounted for movement throughout the cam path;
   c) a support assembly connected to the cam follower for carrying the component within the compartment as the cam follower moves throughout the cam path; and
   d) a flipper cam mounted for movement relative to the cam path between a first position permitting the cam follower to move within the left arcuate side portion and central vertical portion of the cam path so as to translate and rotate the component within a left side of the compartment and a second position permitting the cam follower to move within the right arcuate side portion and central vertical portion of the cam path so as to translate and rotate the component within a right side of the compartment.

2. The mechanism of claim 1, wherein the cam path further includes a left horizontal side portion adjoined with the left arcuate side portion of the cam path and a right horizontal side portion adjoined with the right arcuate side portion of the cam path.

3. The mechanism of claim 1, further comprising a motor mounted to an exterior surface of the end plate for moving the cam follower throughout the cam path.

4. The mechanism of claim 3, wherein the motor is operatively connected to a lead screw that is rotatably supported on the interior surface of the end plate.

5. The mechanism of claim 4, wherein the support assembly includes a connecting block that is threadably associated with the lead screw and is mounted to translate relative thereto in a linear direction.

6. The mechanism of claim 5, wherein the connecting block includes an upstanding actuation pin for moving the flipper cam between the first and second positions as the connecting block translates along the lead screw.

7. The mechanism of claim 6, wherein the support assembly further comprises a translation plate mounted to the connecting block for linear translation therewith.

8. The mechanism of claim 7, wherein the support assembly further comprises a rotation plate connected to the cam follower by a rotation arm that extends through a rotation aperture in the translation plate, wherein the rotation plate is adapted to translate with and rotate relative to the translation plate.

9. The mechanism of claim 7, further comprising a support bracket connected to the rotation plate for supporting the component.

10. The mechanism of claim 6, wherein the flipper cam is pivotably connected to the end plate and wherein an over-centered spring mechanism is associated with an exterior surface of the end plate to retain the flipper cam in the first and second positions thereof until the flipper cam is moved by the actuation pin of the connecting block.

11. The mechanism of claim 10, wherein the flipper cam includes a cam arm with a left arcuate cam surface that forms part of the left arcuate side portion of the cam path and a right arcuate cam surface that forms part of the right arcuate side portion of the cam path.

12. The mechanism of claim 10, wherein the flipper cam includes right and left legs for interacting with the actuation pin on the connecting block.

13. The mechanism of claim 7, wherein a linear slide rod is mounted on the interior surface of the end plate, above and below the cam path, and wherein the translation plate is supported for linear translation along the linear slide rods.

14. The mechanism of claim 13, wherein end stops are provided at each end of each linear slide rod for limiting the linear translation of the translation plate.

15. The mechanism of claim 1, wherein the component is a sensor for collecting imagery, and the compartment is a sensor compartment of a reconnaissance pod for an airborne platform.

* * * * *